United States Patent [19]

Stol

[11] Patent Number: 4,590,358

[45] Date of Patent: May 20, 1986

[54] APPARATUS FOR ELECTRICALLY ISOLATED HOT WIRE SURFACING PROCESSES

[75] Inventor: Israel Stol, Pittsburgh, Pa.

[73] Assignee: Unimation, Inc., Danbury, Conn.

[21] Appl. No.: 657,556

[22] Filed: Oct. 4, 1984

[51] Int. Cl.[4] .............................................. B23K 9/24
[52] U.S. Cl. .............................. 219/136; 219/137.44; 219/137.61
[58] Field of Search ............... 219/136, 137.2, 137.44, 219/137.52, 137.61, 137.8, 76.15

[56] References Cited

U.S. PATENT DOCUMENTS

| | | | |
|---|---|---|---|
| 3,600,549 | 8/1971 | Olshansky et al. | 219/137 |
| 4,447,703 | 5/1984 | Stol | 219/136 |
| 4,493,971 | 1/1985 | Nawa et al. | 219/137.52 |

FOREIGN PATENT DOCUMENTS

| | | | |
|---|---|---|---|
| 323212 | 2/1972 | U.S.S.R. | 219/137.2 |
| 659308 | 4/1979 | U.S.S.R. | 219/137.61 |

Primary Examiner—Clarence L. Albritton
Assistant Examiner—Catherine M. Sigda
Attorney, Agent, or Firm—Thomas R. Trempus

[57] ABSTRACT

The present invention is directed to an improvement for an apparatus which utilizes a preheating step in which the wire heat content of a consumable electrode is increased by means other than the welding current. Thus, the invention provides in combination with at least a first source of electrical power for heating a consumable electrode, a first electrode contact tip having a bore therethrough, a second electrode contact tip having a bore therethrough and a dielectric element having a bore therethrough disposed between the first and second electrode contact tips. The bores are adapted to receive therethrough the consumable electrode for the application of electrical power thereto. The bore of at least one of the electrode contact tips is axially displaced relative to the electrode contact bore of the other electrode contact tip. The invention provides several embodiments whereby either one of the electrode tip bores or the bores of both electrode contact tips are axially displaced. By axially displacing at least one of the bores of the electrode contact tips, electric contact consistency between the consumable electrode and the electrode contact tips is maximized.

10 Claims, 10 Drawing Figures

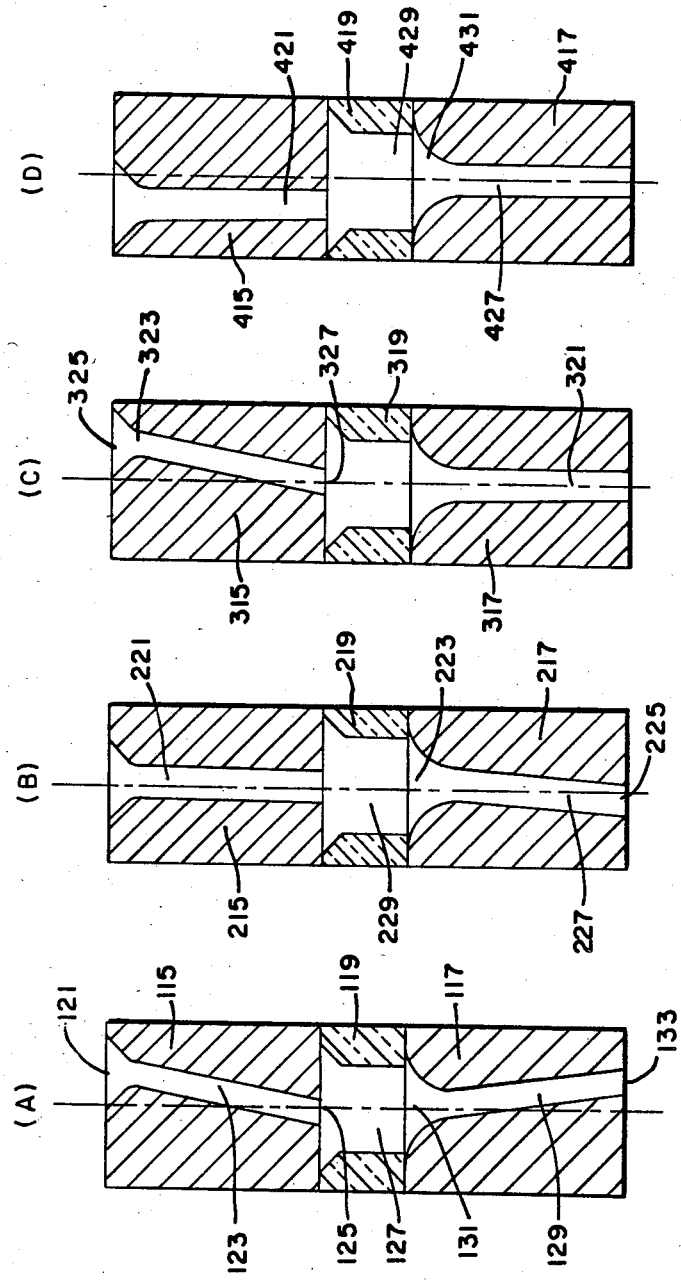

APPARATUS FOR ELECTRICALLY ISOLATED HOT WIRE SURFACING PROCESSES

BACKGROUND OF THE INVENTION

This invention relates to arc welding and, more particularly, the present invention is directed to an apparatus which utilizes a preheating step whereby the wire heat content is increased by means other than welding current.

In conventional gas-metal arc welding (GMAW) processes, heating of the alloyed wire prior to deposition is accomplished by passing welding current through a certain wire length, commonly referred to as the wire stick-out. The power consumed in heating this wire is equal to the product of the square of the welding current and the resistance of the wire. In order to increase the wire deposition rate, the heat content of the wire is increased by increasing the electrical stick-out or the welding current or both.

Excessive wire stick-out leads to uncontrolled wire wandering and/or poor deposit quality. Therefore, welding current is the predominant variable that determines deposition rate and the mode of metal transfer through the arc. However, current intensification leads to more power dissipation in the arc. Since approximately 65 to 85 percent of the arc heat is conducted into the metal base, a higher current would increase arc penetration while increasing deposition rate and decreasing dilution. Although dilution can be reduced by employing higher welding current and slower speeds of travel, these means of control have practical limitations. Higher heat input per unit of length can generate excessive assembly distortion and metallurgical damage in both the deposit and base metal, such as heat affected zone (HAZ) underbead cracking and hot cracking.

In the conventional hot wire gas-tungsten arc welding (HWGTAW) process, heating of the alloyed wire prior to deposition is accomplished by passing heating current through a certain length of wire stick-out. As in the GMAW process, higher wire heat content is adjusted by increasing wire stick-out or increasing heating current or both. This makes the HWGTAW process subject to similar difficulties experienced by the GMAW process. U.S. Pat. No. 4,447,703, which is assigned to the assignee of the present invention and incorporated by reference herein, teaches a technique for overcoming the aforedescribed difficulties. The aforesaid patent describes a technique for preheating the wire at a location remote from the arc and molten pool, thereby reducing the required welding current and wire stick-out length. Thus, in a gas-metal arc welding method in which a power supply feeds welding current through a welding wire electrode into a metal workpiece, the aforesaid patent adds a preheating step in which the wire heat content is increased by means other than the welding current. By increasing the heat content of the wire, a significant reduction in weld dilution is achieved. This preheating is accomplished by passing a current through a wire segment prior to the wire's entry into the stick-out region. The use of preheating the wire limits the length of wire stick-out required to reach a desired wire temperature for a given current in the wire, thereby minimizing wire wandering, improving deposit quality and minimizing arc-wire interaction.

It is therefore an object of this invention to provide an improved concept for electrically isolated hot wire welding, cladding, brazing and/or surfacing processes.

It is also an object of this invention to provide a technique which permits consistent preheating of the wire by passing current between electrical contact tips.

It is a further object of this invention to provide a technique whereby electrical contact consistency between the preheated wire and the electric tips is maximized.

SUMMARY OF THE INVENTION

The present invention is directed to an improvement for an apparatus which utilizes a preheating step in which the wire heat content of a consumable electrode is increased by means other than the welding current. Thus, the invention provides in combination with at least a first source of electrical power for heating a consumable electrode, a first electrode contact tip having a bore therethrough, a second electrode contact tip having a bore therethrough and a dielectric element having a bore therethrough disposed between the first and second electrode contact tips. The bores are adapted to receive therethrough the consumable electrode for the application of electrical power thereto. The bore of at least one of the electrode contact tips is axially displaced relative to the electrode contact bore of the other electrode contact tip. The invention provides several embodiments whereby either one of the electrode tip bores or the bores of both electrode contact tips are axially displaced. By axially displacing at least one of the bores of the electrode contact tips, electric contact consistency between the consumable electrode and the electrode contact tips is maximized.

BRIEF DESCRIPTION OF THE DRAWINGS

The above as well as other features and advantages of the present invention can be readily appreciated through consideration of the detailed description of the invention in conjunction with the several drawings in which:

FIGS. 4A, 4B, 4C and 4D illustrate alternative embodiments of an upper electric contact tip, lower electric contact tip and dielectric tip all in accordance with the teachings of the present invention;

DETAILED DESCRIPTION OF THE INVENTION

In order to fully appreciate the functional advantages obtained by the unique structural relationship of the electrode contact tips used to preheat a wire according to this invention, it is advantageous to first consider the several welding techniques in which this invention can be employed. It will of course be obvious to practitioners skilled in the art that the electrode configurations described herein can be incorporated into any hot wire welding, cladding, brazing and/or surfacing processes and are not to be limited to the techniques described herein. The several examples set forth in FIGS. 1, 2 and 3 are presented as exemplars only and are not to be construed as limiting the scope of implementation of this invention.

Figure 1:
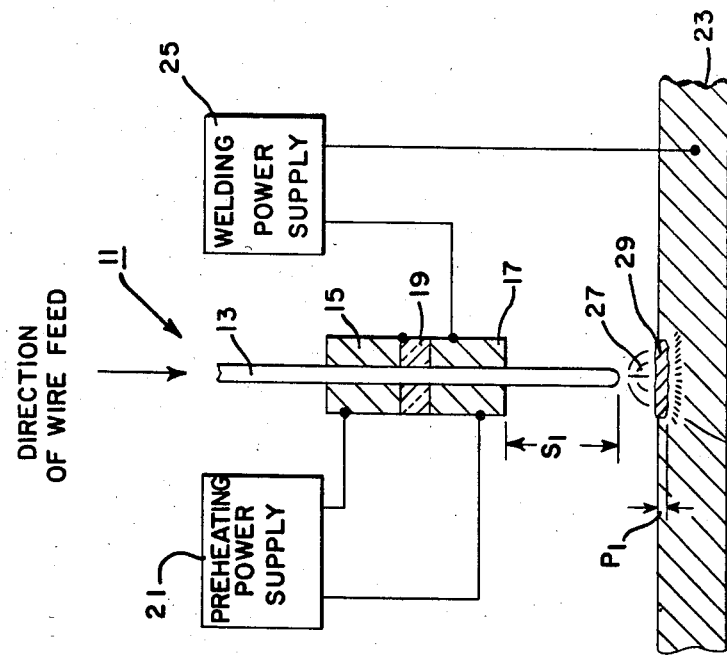
FIG. 1 is an embodiment of a gas-metal arc welding apparatus utilizing the improved electric contact tips according to this invention.
Figure 2:
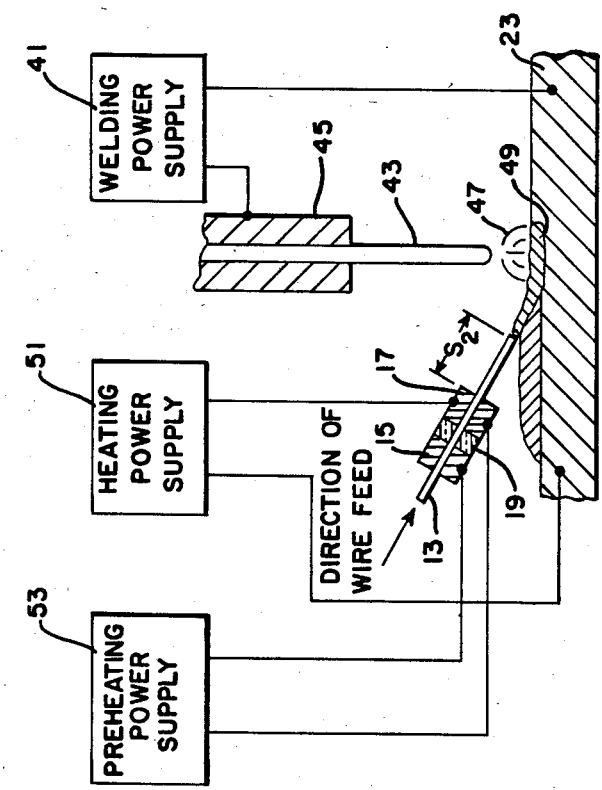
FIG. 2 is an embodiment of gas-tungsten arc welding apparatus utilizing the electric contact tips all in accordance with the present invention.

FIG. 1 illustrates a gas-metal arc welding apparatus generally indicated by the reference character 11. A consumable electrode 13 is provided by a feed means which is not illustrated herein and is conveyed in the direction indicated by the arrow. The consumable electrode wire 13 is in contact with a first electrode contact tip 15 and a second electrode contact tip 17 having a dielectric member 19 disposed therebetween. The electrodes 15 and 17 and dielectric member 19 will be described in detail hereinafter. A wire preheating power supply 21 is connected between electrode contact tips 15 and 17. When consumable electrode 13 is fed toward the workpiece 23 and makes contact with contact tips 15 and 17, current flows through the segment of the electrode located between these contact tips thereby preheating the electrode before it reaches the stick-out region $S_1$. It should be apparent to those skilled in the art that the amount of preheating can easily be adjusted independently of the feeding rate. Additional heating occurs in the stick-out region due to the welding current passing through the electrode. A direct current welding power supply 25 is connected between the workpiece 23 and the electrode contact tip 17. As the consumable electrode 13 approaches the workpiece 23, an arc 27 is created and deposition of consumable electrode 13 begins. The penetration of weld 29 into workpiece 23 is that designated as $P_1$. The use of preheating power supply 21 reduces the welding current needed to reach a given electrode temperature. In addition, the stick-out length is reduced, thereby providing greater control of electrode position.

The use of this preheating step in the gas-metal arc welding process reduces the arc force and penetration, thereby reducing metallurgical damage and distortion of the weld assembly. Penetration $P_1$ and percent dilution are reduced while the range of controllable deposition rates increases. As a result, larger diameter wires can be used to achieve enhanced deposition rates and to maintain wire rigidity with a smaller increase in welding current than required by prior art techniques.

Moreover, preheating the wire segment would also tend to bake out part of the volatile contaminants adhering to the wire's surface, such as moisture and drawing compounds. This occurs away from the gas shielding cone, thus reducing the potential disruption of arc stability and the solution of detrimental constituents, such as hydrogen, by the molten pool. Preheating also promotes ready transfer to the spray metal transfer mode and reduces spatter. The use of multiple preheated wires can result in a high productivity cladding process.

FIG. 2 illustrates a gas-tungsten arc welding apparatus utilizing the electrode contact tips of this invention. A direct current welding power supply 41 is connected to a non-consumable electrode 43 via an electrode contact tip 45 and a workpiece 23. An arc 47 between electrode 43 and workpiece 23 creates a molten pool of metal 49 on the surface of workpiece 23. Heating power supply 51 is connected between electrode contact tip 17 and the workpiece 23. When the consumable electrode 13 is fed into the molten pool 49 while maintaining contact with electrode contact tip 17, current flows through stick-out segment $S_2$, thereby further heating consumable electrode 13. A preheating power supply 53 is connected to electrode contact tips 15 and 17 which are separated by a dielectric material 19. When consumable electrode 13 makes contact with electrode contact tips 15 and 17, current flows through the segment of the consumable electrode located between these contact tips, thereby preheating the electrode before it reaches stick-out region $S_2$. The use of a preheating step in this process allows for shorter wire stick-out and enhanced wire rigidity at any given deposition rate, thereby providing a broadened range of deposition rates. Shorter wire stick-out and enhanced rigidity also make position adjustment, wire wandering and wire straightening less critical. In most cases, wire preheating power supply 53 can be used without power supply 51.

Preheating power supply 53 can utilize alternating, continuous direct or pulsed direct current to supply the required wire heating. Since the preheating current flows remotely from the molten pool 49 and welding arc 47, its magnitude has no effect on electromagnetic arc deflection. The aforedescribed preheating step also provides the advantage that alloys with low electrical resistivities, such as copper or aluminum, can be deposited by the hot wire GTAW process. With the conventional hot wire gas-tungsten arc welding process, these alloys cannot be welded because of the high AC heating current required. These currents cause intense electromagnetic arc deflection.

Figure 3B:
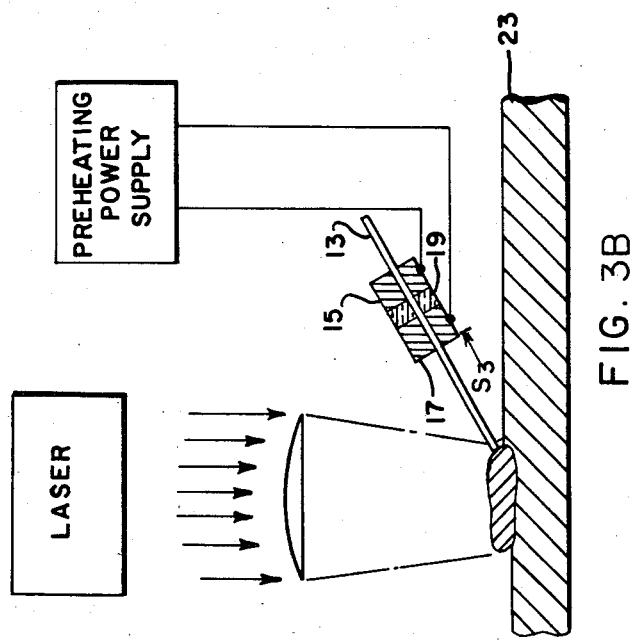
FIGS. 3A and 3B are embodiments of this invention in which a consumable electrode is heated prior to a brazing operation and a laser welding operation respectively.
Figure 3A:
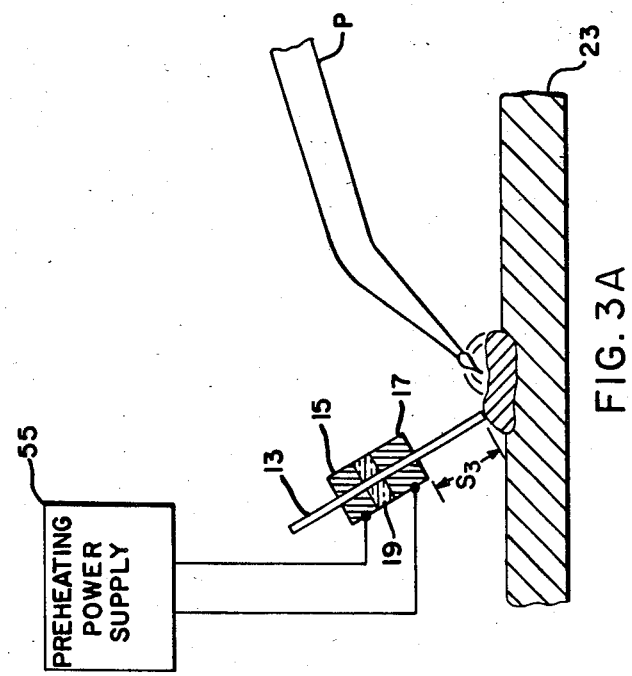

The preheating of the electrode as described above can be incorporated into brazing operations as well as, for example, laser welding techniques. As can be seen in FIGS. 3A and 3B, all that is required is that the consumable electrode 13 be conveyed through a pair of electrode contact tips 15 and 17 to which a preheating power supply 55 is electrically connected. A stick-out region $S_3$ of the preheated wire 13 is brought in proximity with the workpiece 23 at which point the desired process can be effected. The technique illustrated in FIG. 3A represents the use of an independent heat source P. By way of further example, on the one hand, a laser as shown in FIG. 3B which would be focused through a lens or parabolic mirror, oscillated with a mechanical mirror oscillator or integrated with a beam-integrator can be used as a heat source or, on the other hand, a hand-held oxy-acetylene torch could be employed. Another technique could incorporate multiple wire feeds directed to a central point at which the welding operation could be effected.

FIGS. 4A, 4B, 4C, 4D and 5 illustrate alternative embodiments of the invention. While all of the embodiments illustrated herein have been found to enhance the preheating process of the consumable electrode, the embodiment shown in FIG. 5 has proven the most advantageous and is shown in greater detail. Therefore, first considering FIGS. 5 and 6, the improved electrode contact tips of this invention are indicated as upper electrode contact tip 15, lower electrode contact tip 17 and dielectric insert 19. The unique functional continuity of contact tip 15, contact tip 17 and the dielectric 19 maximizes electric contact consistency between the consumable wire and the electrical contact tip surfaces which provide the preheating current to the filler wire. The dielectric tip 19 provides a sacrificial material which protects the internal structure of a welding torch not shown herein, from either melting locally and/or becoming mechanically damaged by wire jam-ups resulting from wire hesitation or wire overheating and collapsing. Moreover, the dielectric tip 19 provides a "sleeve" which collects substantially all of the contaminants such as drawing compounds and shavings which originate from the wire surface. As will be more readily appreciated hereinafter, the bore 61 of the dielectric tip 19, although overenlarged by comparison to the consumable electrode's diameter, still provides a significant level of support to the wire and prevents the wire from buckling while being heated. Such a feature is particularly advantageous when the welding torch system requires some time to readjust the preheating current in response to a change in the wire feed rate, particularly, a reduction in the wire feed rate. The temporary support of the wire by the dielectric tip renders a degree of "forgiveness" in time for the system to extricate itself from a potential jam-up.

I have discovered that a significant key to obtaining consistent preheating of the consumable electrode by passing current between the lower electrode contact tip 17 and the upper electrode contact tip 15 resides in the disposition of the bores through which the consumable electrode travels within each of those contact tips with respect to one another. Thus, for maximized electric contact consistency between the consumable electrode wire, and both the upper and lower electric tips 15 and 17, the channels 63 and 65 should be displaced relative to each other. I have experimentally determined that the use of electrode contact tips which incorporate the features of this invention maintain electrical contact consistency between the consumable electrode wire and the electrode contact tips to within approximately ±5 amperes variance of the desired current. Heretofore, electrode contact tips with coaxial bores experienced variances of up to ±100 amperes due to ineffective electrical contact techniques.

Figure 5:
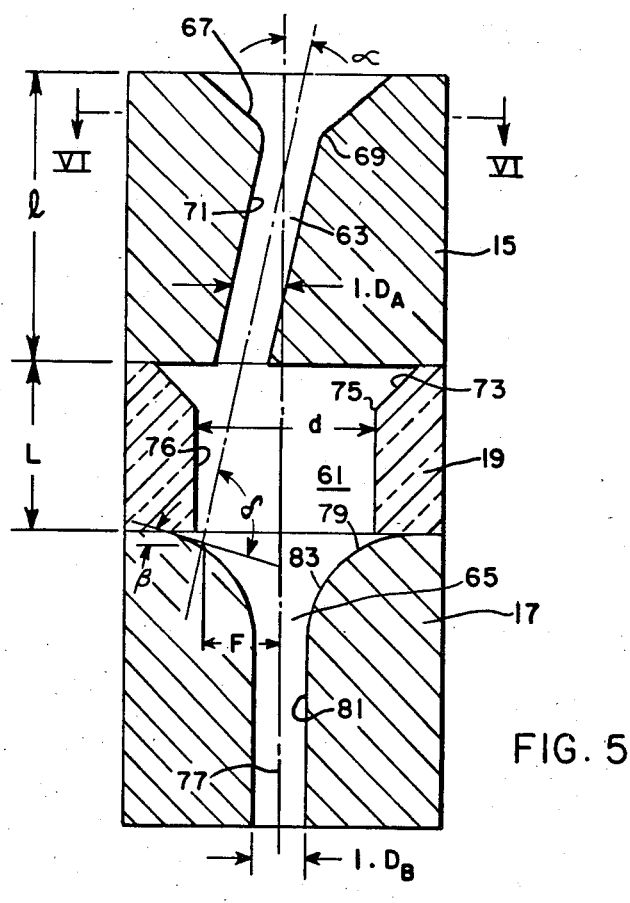
FIG. 5 is a detailed illustration of the upper and lower electric contact tips and dielectric tip disposed therebetween incorporating the preferred embodiment of this invention.
Figure 6:
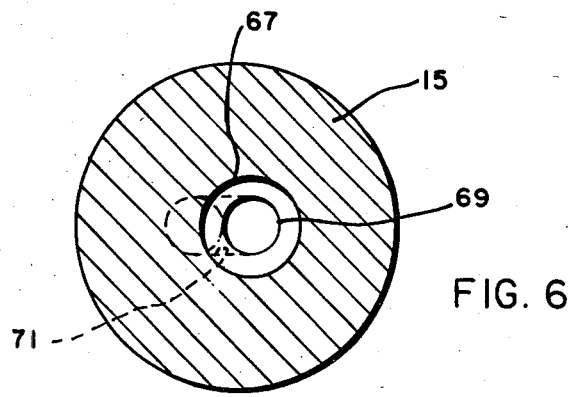
FIG. 6 is a cross-sectional view of the preferred embodiment of FIG. 5 along lines VI—VI.

The preferred embodiment shown in detail in FIG. 5 incorporates the upper electrode contact tip bore 63 in a generally slanted disposition and generally axial displacement relative to the substantially straight bore 65 of the lower electric contact tip. The orientation of the upper tip's bore 63 slanting plane and its displacement are always fixed relative to the bore of the lower tip, regardless of the rotation of these tips relative to each other. This of course assumes that both electric contact tips are aligned along a common axis.

It is preferred that the entrance portals of both electric contact tips and the dielectric tip are made larger than the bore diameter with which the portals are associated. The upper electric contact tip 15 has a bore 63 disposed therein. The upper portion of the electric contact tip preferably includes a cone-like portion 67 which defines the entrance portal. The junction of the portal 67 and the bore 63 defines a tapered shoulder 69.

The dielectric tip 19 disposed between the upper electric contact tip 15 and the lower electric contact tip 17 and preferably disposed in intimate contact therebetween defines an interior channel 71 which is dimensioned such as to receive the consumable electrode as it exits the upper electric contact tip 15 and to channel said electrode into the channel 65 defined by lower electric contact tip 17. The dielectric tip 19 can include a portal 73 at the upper portion thereof and rounded corners 75 at the junction of the portal and the interior walls 76.

The lower electric contact tip 17 also includes a channel 65 disposed therein and a portal 79 at the upper reaches thereof. The junction of the channel walls 81 and the portal 79 defines a rounded-off portion 83. Absent the use of tapered shoulders with the rounded off portion 83, the junction between the bore 65 and the portal 79 could tend to act as a sharp "knife" on the heat-softened wire passing thereover. The consequence of this "knifing" action on the wire is that wire is continuously "shaved-off". The accumulation of these metallic shavings in the bore and/or just above the knifing corner, can lead to frequent difficulties in wire feeding consistency, consistency of electric contact between the wire and the bore's walls 81, frequent wire jamming incidence associated with these two occurrences and/or accelerated wear of tips and the resultant frequent replacement thereof.

It has been experimentally determined that particularly advantageous results in preheating consumable electrodes can be obtained through a specific relationship of the various components of this invention. For example, it has been determined that the bore diameter of both contact tips 15 and 17 should be within the 0.003 to 0.014 inch range larger than the wire diameter. Thus, for example, a 0.062 inch wire diameter suggests that the bore diameter of the tips should be approximately 0.067 inches. The length of the dielectric tip 19 indicated as L should be about 8.06 times the diameter of the wire. Thus, for example, the 0.062 inch diameter wire suggests the use of a dielectric tip which is 0.500 inches in length or for a 0.045 inch diameter wire the dielectric length should be 0.363 inches. The inside diameter of the dielectric tip indicated by d should be about 2 to 9 times the wire diameter. Thus, for the 0.062 inch diameter wire the tip's inside diameter will be approximately 0.138 inches. The channel 63 of the upper electric contact tip 15 should be disposed at an angle $\alpha$ relative to the axial disposition of all three elements and the tangential angle $\beta$ to the entrance portal 79 of the lower electric contact tip must be aligned so that the angle between the wire entering the dielectric tip and the rounded portion of the lower tip's portal is within the range of approximately 100 to 160 degrees, as indicated at $\delta$. The design relationship between these angles is $$\delta = 90 - \alpha + \beta. \tag{1}$$

The displacement indicated at F of the wire's tip relative to the central line 77 of the channel and the lower tip 17 is to be experimentally determined for each type of filler metal and wire diameter. The most suitable value of F can vary from wire to wire. This displacement F is trigonometrically related to the "slanting" angle of the channel 63 in the upper tip as indicated at $\alpha$, the length of the upper electric contact tip l and the length of the dielectric tip L. The relationship is shown in the equation (2) below:

$$\tan \delta = \frac{F}{l + L} \tag{2}$$

Based on the equation (2) above, it becomes clear that for a given wire diameter, the dimension F determines how much of the wire's cross-section will be allocated for friction rubbing against the entrance portal of the lower electric tip.

Thus, in actual practice, the value of the dimension indicated at δ and F must be chosen for each wire diameter and alloy. The selection of these is a matter of practical compromise between improved electric contact consistency which is achieved with smaller values of δ and larger values of F, frictional drag encountered by the wire and resultant amount of wire shavings accumulated in the bore of the lower tip, both of which are desirably reduced with larger values of δ and smaller values of F and tip's durability, which is increased with larger δ values and smaller F values.

By way of example, it has been found that the dielectric tip 19 can be manufactured from materials such as alumina and fired lava. The electric contact tips 15 and 17 can be manufactured from materials such as copper-beryllium, copper-chromium, copper with some graphite in its matrix, tough-pitch copper, and molybdenum.

Based on the aforedescribed relationship of the various components of this invention, Table I represents successful tip combinations developed for welding and continuously preheating wires. This Table illustrates several consumable electrode alloy types with their wire diameter and a particularly useful electrode contact tip configuration.

| Consumable Electrode | | Upper Electric Contact Tip | | | Ceramic Tip | | Lower Electric Contact Tip | |
|---|---|---|---|---|---|---|---|---|
| Alloy Type | Wire Dia. | ID A | Length l | Slanting Angle α | ID d | Length L | ID B | R |
| A681 | 0.063 | 0.067 | 1.010 | 2° | 0.160 | 0.500 | 0.070 | 0.060 |
| Inconel 82 | 0.063 | 0.067 | 1.010 | 2° | 0.160 | 0.500 | 0.070 | 0.060 |
| A681 | 0.045 | 0.052 | 1.25 | 1.09° | 0.160 | 0.360 | 0.052 | 0.060 |
| Hi Silicone Bronze | 0.035 | 0.049 | 1.25 | 1.01° | 0.160 | 0.360 | 0.049 | 0.060 |

Turning now to FIGS. 4A, 4B, 4C and 4D, several alternative embodiments of the electric contact tip configuration of this invention are illustrated. In FIG. 4A both the upper electric contact tip 115 and the lower electric contact tip 117 are provided with slanted channels. Utilizing the axis indicated at A, it is noted that the entrance portal 121 of channel 123 of the upper electric contact tip 115 is radially spaced relative to that axis. The end of channel 123 as at 125 is disposed in generally axial alignment with axis A. The consumable electrode would thus pass through channel 123 and exit in generally axial alignment with all three components. The consumable electrode would pass through the channel 127 of the dielectric tip 119 and enter the channel 129 of the lower electric tip 117. The portal 131 of the lower electric contact tip is substantially aligned with the axis A. The exit area 133 of channel 129 is thus radially displaced relative to the axis A.

Turning to FIG. 4B, the channel 221 of the upper electric contact tip 215 is substantially axially aligned with the axis B, about which all three elements are configured. However, while the entrance portal 223 at the lower electric contact tip 217 is is also generally axially aligned, the exit area 225 of channel 227 is radially displaced relative to the axis B. The dielectric element 219 disposed between the upper and lower electric contact tips also includes a channel 229 which functions as described above.

In the embodiment shown in FIG. 4C, the channel 321 of the lower electric contact tip 317 is in substantial axial alignment while the channel 323 of the upper electric contact tip 315 is radially displaced. More particularly, the entrance portal 325 of channel 323 is radially displaced relative to axis C while the exit portion 327 of channel 323 is generally axially aligned. The dielectric tip 319 is disposed between the upper and lower electric contact tips. As can be seen, a variety of configurations are possible using the teachings of this invention. What is essential is that at least one of the channels through which the consumable electrode passes during the preheating stage is "slanted" relative to the axis defined by the disposition of the upper electric contact tip, the dielectric tip and the lower electric contact tip. It should be appreciated that in the configurations such as shown in FIG. 4A in which both the upper electric contact tip and lower electric contact tip include slanted channels, rotational disposition of the lower electrical contact tip relative to the upper electric contact tip will alter the relationship of the channels in each tip relative to each other. However, in the preferred embodiment as shown in FIG. 5, any rotational disposition of the upper electric contact tip 15 relative to the lower electric contact tip 17 will not disturb the unique relationship defined between the channels of each electric contact tip. This is because the entrance portal of the upper electrode contact tip is axially aligned with the axis 77 (FIG. 5) while the exit portion is axially displaced and the bore of the lower electrode contact tip is substantially axially aligned. It should also be appreciated that while the cross-sectional view shown in FIG. 6 of the upper electric contact tip 15 of FIG. 5 illustrates that the electric contact tip is a generally tubular-like member, the configuration of the body portion of either electric contact tip is variable. What is important is that the channels for all three elements are so aligned as to function as described above.

In the embodiment shown in FIG. 4D, the channel 421 of the upper electrode contact tip 415 is axially aligned with but uniformly radially spaced from the axis D about which all three elements are configured. The lower electrode contact tip 417 has a channel 427 which is substantially axially aligned with the axis D. As a result, the channels 421 and 427 are parallel to the axis D with preferably channel 421 of the upper electrode contact tip 415 radially spaced from the axis. The dielectric element 419 disposed between the upper and lower electric contact tips includes a channel 429 which functions as described above. It should be appreciated that the portal region 431 of the lower electrode contact tip 417 is dimensioned to receive the consumable electrode as it exits the upper electrode contact tip, and guide the electrode into the channel 427. This "axially offset" configuration has shown improved electric contact consistency consistent with the teachings of this invention.

What has been described is a concept for electrically isolated hot wire operations that maximizes the electric contact consistency between the consumable electrode and the electric contact tips.

What is claimed is:

1. An apparatus for welding a metal workpiece comprising a first source of electric power operatively connected between a first electrode contact tip and a second electrode contact tip, a second source of electric power operatively connected between the second electrode contact tip and the workpiece, a consumable electrode slidably disposed between said electrode contact tips wherein the preheat content of the consumable electrode is controlled by adjusting current flowing through the consumable electrode and the first and second electrode contact tips, and a dielectric element disposed between the first and second electrode contact tips, the improvement wherein: the first electrode contact tip, the second electrode contact tip and the dielectric element each comprise a discrete member mounted in axial alignment and each discrete member has a bore therethrough through which the consumable electrode passes and wherein the bore in at least one of the electrode contact tips is axially displaced with respect to the axis defined by the axial alignment of the discrete members whereby the aforesaid axial displacement of the bore in at least one of the electrode contact tips maximizes the electric contact consistency between the consumable electrode and that particular electrode contact tip.

2. The apparatus according to claim 1 wherein the bore in at least one of the electrode contact tips which is axially displaced is slanted with respect to the axis defined by the axial alignment of the discrete members.

3. The apparatus according to claim 1 wherein the bore in at least one of the electrode contact tips which is axially displaced is both parallel to and radially displaced from the axis defined by the axial alignment of the discrete members.

4. The apparatus according to claim 1 wherein the bores of both the first and the second electrode contact tips are axially displaced with respect to the axis defined by the axial alignment of the discrete members.

5. The apparatus according to claim 1 wherein each electrode contact tip includes a portal region of an initially greater diameter than the diameter of the bore therein such that said portal region guides the consumable electrode into said bore.

6. In combination with at least a first source of electrical power for heating a consumable electrode, a first electrode contact tip, a second electrode contact tip and a dielectric element disposed between said first and second electrode contact tips, both of said contact tips and said element comprising discrete members mounted in axial alignment and each discrete member having a bore therethrough through which the consumable electrode passes wherein the bore of at least one of said electrode contact tips is axially displaced with respect to the axis defined by the axial alignment of the discrete members whereby the aforesaid axial displacement of the bore in at least one of the electrode contact tips maximizes the electric contact consistency between the consumable electrode and that particular electrode contact tip.

7. The combination according to claim 6 wherein the bore in at least one of the electrode contact tips which is axially displaced is slanted wth respect to the axis defined by the axial alignment of the discrete members.

8. The combination according to claim 6 wherein the bore in at least one of the electrode contact tips which is axially displaced is both parallel to and radially displaced from the axis defined by the axial alignment of the discrete members.

9. The combination according to claim 6 wherein the bores of both the first and the second electrode contact tips are axially displaced with respect to the axis defined by the axial alignment of the discrete members.

10. The combination according to claim 6 wherein each electrode contact tip includes a portal region of an initially greater diameter than the diameter of the bore therein such that said portal region guides the consumable electrode into said bore.

* * * * *